United States Patent
Yoshida

(10) Patent No.: US 11,091,059 B2
(45) Date of Patent: Aug. 17, 2021

(54) SEAT RAIL MOUNTING STRUCTURE FOR VEHICLE

(71) Applicant: Toyota Jidosha Kabushiki Kaisha, Toyota (JP)

(72) Inventor: Takahiro Yoshida, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 122 days.

(21) Appl. No.: 16/524,648

(22) Filed: Jul. 29, 2019

(65) Prior Publication Data

US 2020/0039383 A1 Feb. 6, 2020

(30) Foreign Application Priority Data

Aug. 1, 2018 (JP) .............................. JP2018-145238

(51) Int. Cl.
*B60N 2/015* (2006.01)
*B60N 2/07* (2006.01)
*B60N 2/005* (2006.01)

(52) U.S. Cl.
CPC ............. *B60N 2/015* (2013.01); *B60N 2/005* (2013.01); *B60N 2/0735* (2013.01)

(58) Field of Classification Search
CPC .......... B60N 2/005; B60N 2/015; B60N 2/07; B60N 2/0735; B62D 25/20; B62D 25/2009
USPC .......................................... 296/65.13, 193.07
See application file for complete search history.

(56) References Cited

U.S. PATENT DOCUMENTS

| | | | | |
|---|---|---|---|---|
| 4,830,422 A | * | 5/1989 | Levitre | B60N 2/015 248/429 |
| 2009/0134687 A1 | * | 5/2009 | Kurokawa | B60N 2/06 297/463.1 |
| 2010/0270822 A1 | * | 10/2010 | Fujitsuka | B60N 2/073 296/65.13 |
| 2017/0158039 A1 | * | 6/2017 | Nakamura | B60K 1/04 |
| 2020/0009992 A1 | * | 1/2020 | Kadiu | B62D 25/20 |

FOREIGN PATENT DOCUMENTS

| | | | |
|---|---|---|---|
| DE | 102005042682 A1 * | 3/2007 | ............. B62D 25/20 |
| JP | 2007-176226 A | 7/2007 | |
| JP | 2016-124436 A | 7/2016 | |

OTHER PUBLICATIONS

English translation of DE 10 2005 042 682; retrieved on Jan. 26, 2021 via PatentTranslate located at www.epo.org. (Year: 2021).*

* cited by examiner

*Primary Examiner* — Jason S Daniels
(74) *Attorney, Agent, or Firm* — Dinsmore & Shohl LLP

(57) ABSTRACT

The structure for mounting a seat rail includes a floor panel constituting the floor of a cabin; a seat rail disposed on the upper surface of the floor panel; and a retainer for supporting the floor panel at a position where the seat rail is present thereabove with the floor panel in-between. The seat rail, the floor panel, and the retainer are attached to one another with a bolt and a nut (a first attachmenting portion) at a position where the seat rail, the floor panel, and the retainer are placed overlapping one on the other. The floor panel is welded on the retainer at a position (a second attachmenting portion) away from the first attachment portion. The retainer has a bead formed between the first attachment portion and the second attachment portion. The bead extends along the longitudinal direction of a seat rail.

18 Claims, 8 Drawing Sheets

SEAT RAIL MOUNTING STRUCTURE FOR VEHICLE

CROSS REFERENCE TO RELATED APPLICATION

This application claims priority to Japanese Patent Application No. 2018-145238 filed on Aug. 1, 2018, which is incorporated herein by reference in its entirety including the specification, claims, drawings, and abstract.

TECHNICAL FIELD

The present disclosure relates to a structure for mounting a seat rail for vehicles and, in particular, to a structure for mounting a seat rail on the floor of a cabin.

BACKGROUND

A wide range of studies have been conducted on structures for mounting seats of automobiles on vehicle bodies. Specifically, some seats are attached to seat rails securely mounted on the floor of a cabin (or a floor surface) and are freely adjustable in position along the seat rail. In such a structure, as a force will be applied to the floor from the seat via the seat rail due to the inertia of the seat while the automobile is running, the floor or members thereabout may be deformed or the seat rail may be displaced after repetitive driving of the automobile. To address the above, a technique for increasing the mechanical strength of a structure for mounting a seat rail on the floor has been suggested.

For example, Patent Document 1 below describes a seat bracket that connects a seat rail and a floor. The seat bracket is connected to a slanting side surface of a step on the floor, and supports the seat rail above the side surface. Patent Document 1 suggests a shape of a seat bracket that provides high strength relative to a force pulling upward, and describes that the shape enables prevention of displacement in the position of the seat rail.

Patent Document 2 describes an under-floor cover that prevents twisting or deformation of a portion where a driver seat is mounted. The under-floor cover is a panel member mounted below the floor panel. Patent Document 2 describes that a reinforcement having a cross shape is attached to an under-floor cover to prevent twisting and deformation of a portion where a driver seat is mounted. Patent Document 2 also describes that the under-floor cover can increase operability in driving.

CITATION LIST

Patent Literature

Patent Document 1: JP No. 2007-176226A
Patent Document 2: JP No. 2016-124436A

SUMMARY

In general, the floor of a vehicle cabin is made using a floor panel made of a metal panel, for example. Some floor panels are fixed above a framework member that bridges over a gap in the bottom of a vehicle. For such a floor panel, easiness in deformation may differ between a location where a framework member is present immediately below the floor panel and a location without such a framework member. Hence, the floor panel may deform due to a force imparted thereto from a seat rail, depending on the position of a seat rail or a structure for fixing a seat rail to the floor panel.

In view of the above, an object of the present disclosure is to increase the mechanical strength of a structure for mounting a seat rail to the floor of a cabin.

According to one aspect of the present disclosure, there is provided a structure for mounting a seat rail for a vehicle, including a floor panel constituting the floor of a cabin; a seat rail disposed on the upper surface of the floor panel; a retainer for supporting the floor panel at a position where the seat rail is present above with the floor panel in-between; a first attachment portion for attaching the seat rail, the floor panel, and the retainer at a position where the seat rail, the floor panel, and the retainer are disposed overlapping one another; and a second attachment portion for attaching the floor panel and the retainer at a position away from the first attachment portion, wherein the retainer includes a bead formed between the first attachment portion and the second attachment portion so as to extend along the longitudinal direction of the seat rail.

In one embodiment, a plurality of first attachment portions and a plurality of second attachment portions may be respectively aligned along the longitudinal direction of the seat rail, and the bead may extend in the longitudinal direction of the seat rail between the plurality of aligned first attachment portions and the plurality of aligned second attachment portions. In one embodiment, the seat rail may extend in the front-back direction of the vehicle, and the second attachment portion may be defined at a position deviated leftward or rightward from the first attachment portion.

In one embodiment, the structure may further include a plurality of retainer attachment portions aligned in a direction intersecting with the longitudinal direction of the seat rail, for attaching the retainer and a framework member in the bottom of the vehicle, and the bead may be formed between two adjacent retainer attachment portions among the plurality of retainer attachment portions.

In one embodiment, the bead may extend between the first attachment portion and the second attachment portion to reach between two adjacent retainer attachment portions among the plurality of retainer attachment portions.

In one embodiment, a plurality of first attachment portions and a plurality of second attachment portions may be respectively aligned along the longitudinal direction of the seat rail, and the bead may extend between the plurality of aligned first attachment portions and the plurality of aligned second attachment portions aligned to reach between two adjacent retainer attachment portions among the plurality of retainer attachment portions.

In one embodiment, the retainer may include a section fixed to a framework member in the bottom of the vehicle, and a section expanding from the framework member, for supporting the floor panel, and the bead may extend in the direction in which the retainer extends from the framework member.

In one embodiment, the first attachment portion may include a fastening piece that penetrates respective holes defined on the retainer, the floor panel, and the seat rail, and the second attachment portion may include a welding portion where the floor panel is welded to the retainer.

According to the present disclosure, it is possible to increase the mechanical strength of a structure for mounting a seat rail on the floor of a cabin.

BRIEF DESCRIPTION OF DRAWINGS

Embodiment(s) of the present disclosure will be described by reference to the following figures, wherein.

DESCRIPTION OF EMBODIMENTS

Figure 1:
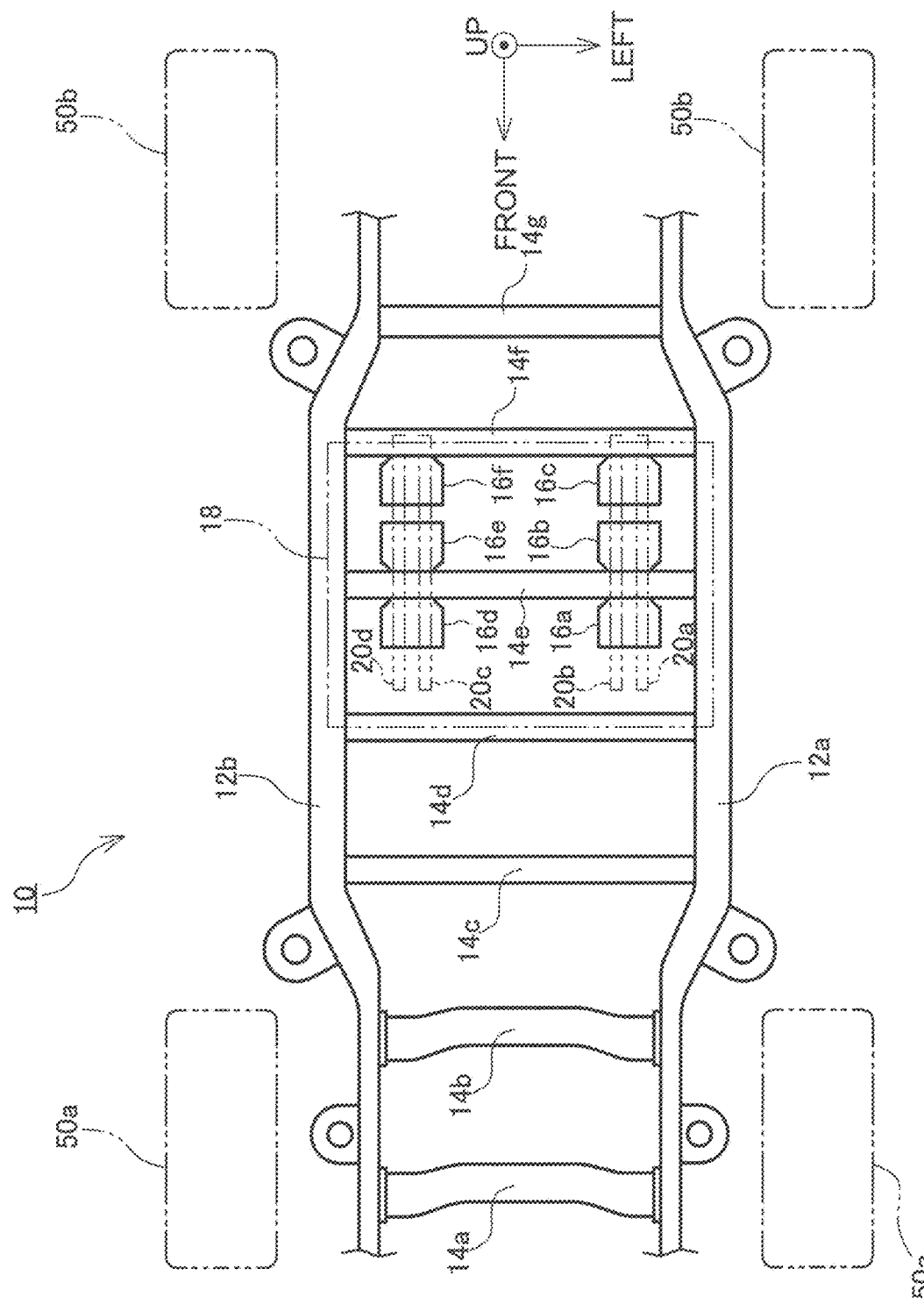
FIG. 1 illustrates an example of a framework structure in the bottom of a vehicle.

By reference to the respective drawings, a structure for mounting a seat rail, or a seat rail mounting structure, according to an embodiment of the present disclosure will now be described. Note that terms such as front or forward, rear or rearward, up, down, left, and right in the specification of this application indicate respective directions as viewed from an occupant of a vehicle. The same structural components illustrated in two or more drawings are assigned the same reference numerals, and their descriptions will not be repeated.

FIG. 1 illustrates an example of a framework structure of a seat rail mounting structure in the bottom of a vehicle. The framework structure 10 has a structure including a band-like or bar-like framework member (frame) that bridges over a gap in the bottom of a vehicle. The upper side of the framework structure 10 is covered by a floor panel 18, as indicated by the long dashed double-short dashed line, whereby the floor of a cabin is constituted. Seat rails 20a to 20d are secured to the floor. A seat in the cabin is fixed to the floor so as to slide in the front-back direction of the vehicle via the respective seat rails.

As framework members extending in the front-back direction, the framework structure 10 includes a side member 12a on the left side of the vehicle and a side member 12b on the right side of the vehicle. The interval in the right-left direction between the side members 12a and 12b becomes shorter in a certain section while going forward, so that the interval in the forward area is shorter than that in the middle area. Front wheels 50a are mounted on the left side of the side member 12a and on the right side of the side member 12b in the forward area. Further, the interval in the right-left direction between the side members 12a and 12b becomes shorter in a certain section while going rearward, so that the interval in the rearward area is shorter than that in the middle area. Rear wheels 50b are mounted on the left side of the side member 12a and the right side of the side member 12b in the rearward area.

The framework structure 10 includes cross members 14a to 14g aligned in the front-back direction as framework members extending in the right-left direction. Each of the cross members 14a to 14g bridges the side member 12a and the side member 12b.

The fifth cross member 14e from the front has retainers 16a, 16b, 16d, 16e. The sixth cross member 14f from the front has retainers 16c, 16f. Each retainer is a panel-piece member made of rigid material, such as metal, and supports, together with the framework structure 10, the floor panel 18.

The retainers 16a, 16b are mounted on the left half of the cross member 14e. Specifically, a part of the retainer 16a is fixed to the lower surface of the cross member 14e such that the retainer 16a expands forward. Further, a part of the retainer 16b is fixed to the lower surface of the cross member 14e such that the retainer 16b expands rearward. The retainer 16c is mounted on the left half of the cross member 14f. Specifically, a part of the retainer 16c is fixed to the lower surface of the cross member 14f such that the retainer 16c expands forward.

The respective retainers 16d, 16e have structures similar to those of the retainers 16a, 16b, and are mounted on the right half of the cross member 14e in the same postures as those of the retainers 16a, 16b. The retainer 16f has a structure similar to that of the retainer 16c, and is mounted on the right half of the cross member 14f in the same posture as that of the retainer 16c.

The area between the cross member 14e and the cross member 14f is covered by the floor panel 18. The retainers 16a to 16f are in contact with the lower surface of the floor panel 18, and support, together with the framework structure 10, the floor panel 18. On the upper surface of the floor panel 18, the seat rails 20a, 20b are aligned with their front and rear ends directed in the longitudinal direction in positions where the retainers 16a to 16c are disposed immediately below. Similarly, the seat rails 20c, 20d are aligned with their front and rear ends directed in the longitudinal direction in positions where the retainers 16d to 16f are disposed immediately below. The respective seat rails extend in the front-back direction so as to intersect with the cross members 14e, 14f, with the end portions of the seat rails positioned on the cross member 14g.

The framework structure 10 is used in vehicles such as minivans, whose rear seats are freely adjustable in position. The seat rails 20a to 20d support a rear seat on the upper surface of the floor panel 18. That is, the pair of seat rails 20a, 20b on the left side slidably support the left side of the rear seat, while the pair of seat rails 20c, 20d on the right side slidably support the right side of the rear seat. Sliding the rear seats on these seat rails enables adjustment of the positions of the rear seats.

Figure 2:
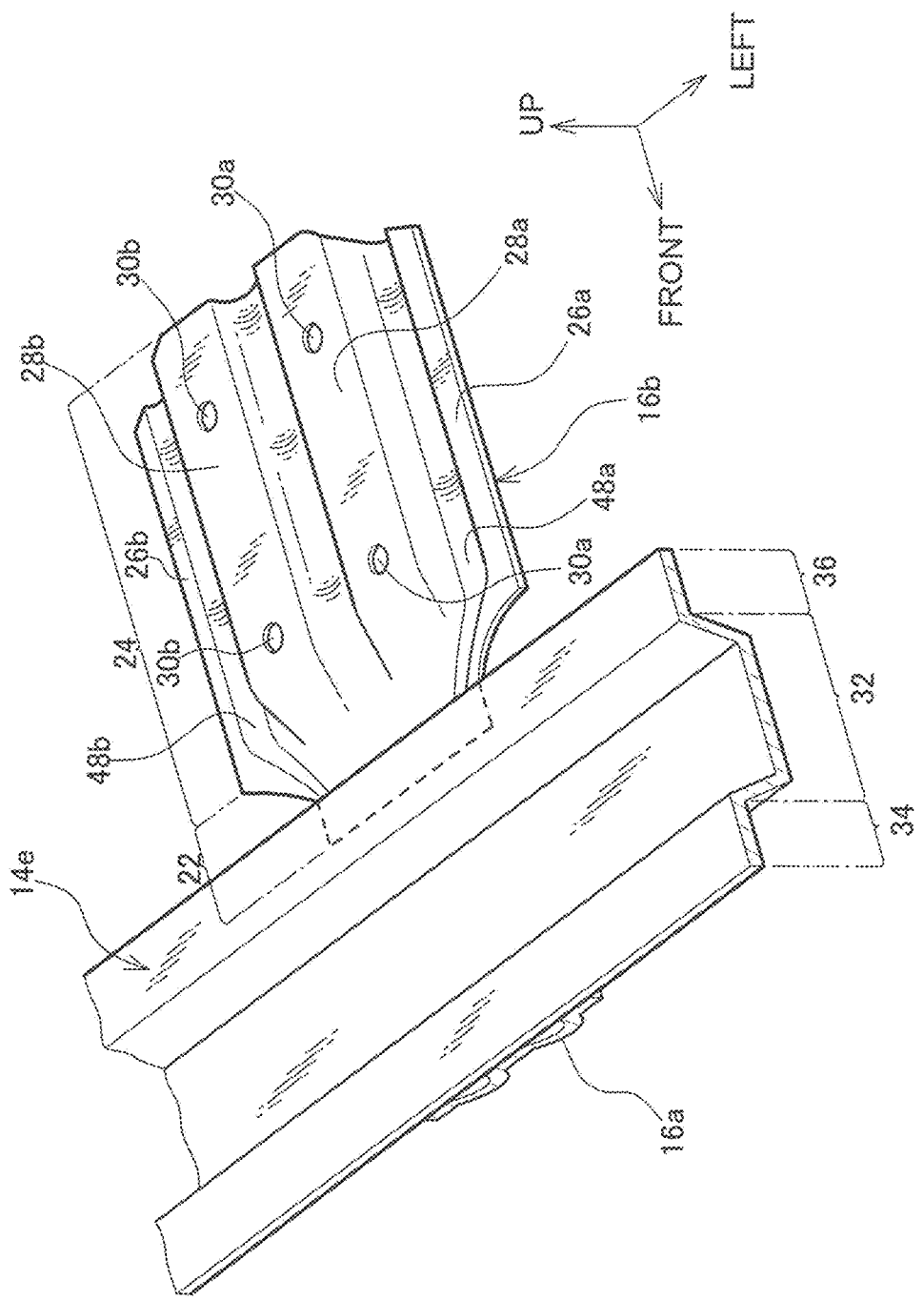
FIG. 2 is a perspective view of a cross member and a retainer.

FIG. 2 is a perspective view of the cross member 14e and the retainer 16b. The cross member 14e includes a U-shaped groove 32, a front flange 34, and a rear flange 36. The U-shaped groove 32 has a U-shaped cross section and extends in the right-left direction. The front flange 34 expands forward from the front edge of the U-shaped groove 32, while the rear flange 36 expands rearward from the rear edge of the U-shaped groove 32. The retainer 16b includes a substantially rectangular main section 24 and an extending section 22. The main section 24 has a peripheral edge that is partially cut off. The extending section 22 extends from a shorter edge of the main section 24. A part of the extending section 22 of the retainer 16b is placed on, or overlaps, the lower surface of the rear flange 36, and is attached (fixed) to the lower surface of the rear flange 36 through welding such that the extending section 22 expands rearward from the rear flange 36. The width of the extending section 22 becomes wider as it goes from the rear flange 36 toward the main section 24 to be equal to the width of the main section 24 at the boundary with the main section 24. Alternatively, the cross member 14e may be a flat band shape without the U-shaped groove 32. Still alternatively, the cross member 14e may include a plurality of U-shaped grooves aligned in parallel.

The main section 24 has two swelling portions 28a, 28b. The swelling portions 28a, 28b swell upward and extend in the front-back direction. The swelling portions 28a, 28b are aligned in the right-left direction. The left swelling portion 28a has two bolt holes 30a aligned in the front-back direction for fixture of the floor panel and the seat rail. Similarly, the right swelling portion 28b has two bolt holes 30b aligned in the front-back direction for fixture of the floor panel and the seat rail.

To the left of the swelling portion 28a, a flat section 26a is formed extending in the front-back direction. Similarly, to the right of the right swelling portion 28b, a flat section 26b extending in the front-back direction is formed. These flat sections are in contact with the floor panel disposed above covering the flat sections, and welded to the floor panel.

A bead 48a is formed between the left swelling portion 28a and the flat section 26a. A bead refers to a portion of a panel member, the portion being a recessed or swelling portion extending in a certain direction. The bead 48a in FIG. 2 is recessed downward and extends in the front-back direction from the main section 24 to the extending section 22. Similarly, a bead 48b is formed between the right swelling portion 28b and the flat section 26b. The bead 48b is recessed downward and extends in the front-back direction from the main section 24 to the extending section 22. Alternatively, the beads 48a, 48b on the retainer 16b may swell upward.

As will be described later, formation of the beads 48a, 48b on the retainer 16b increases the strength of the retainer 16b relative to a force applied in the up-down direction to the retainer 16b from the outside. Further, the strength of the floor panel, which overlaps the retainer 16b, relative to a force applied in the up-down direction is also increased. Consequently, the mechanical strength of the floor panel and the retainer 16b relative to a force applied from the seat rail is increased.

Figure 3:
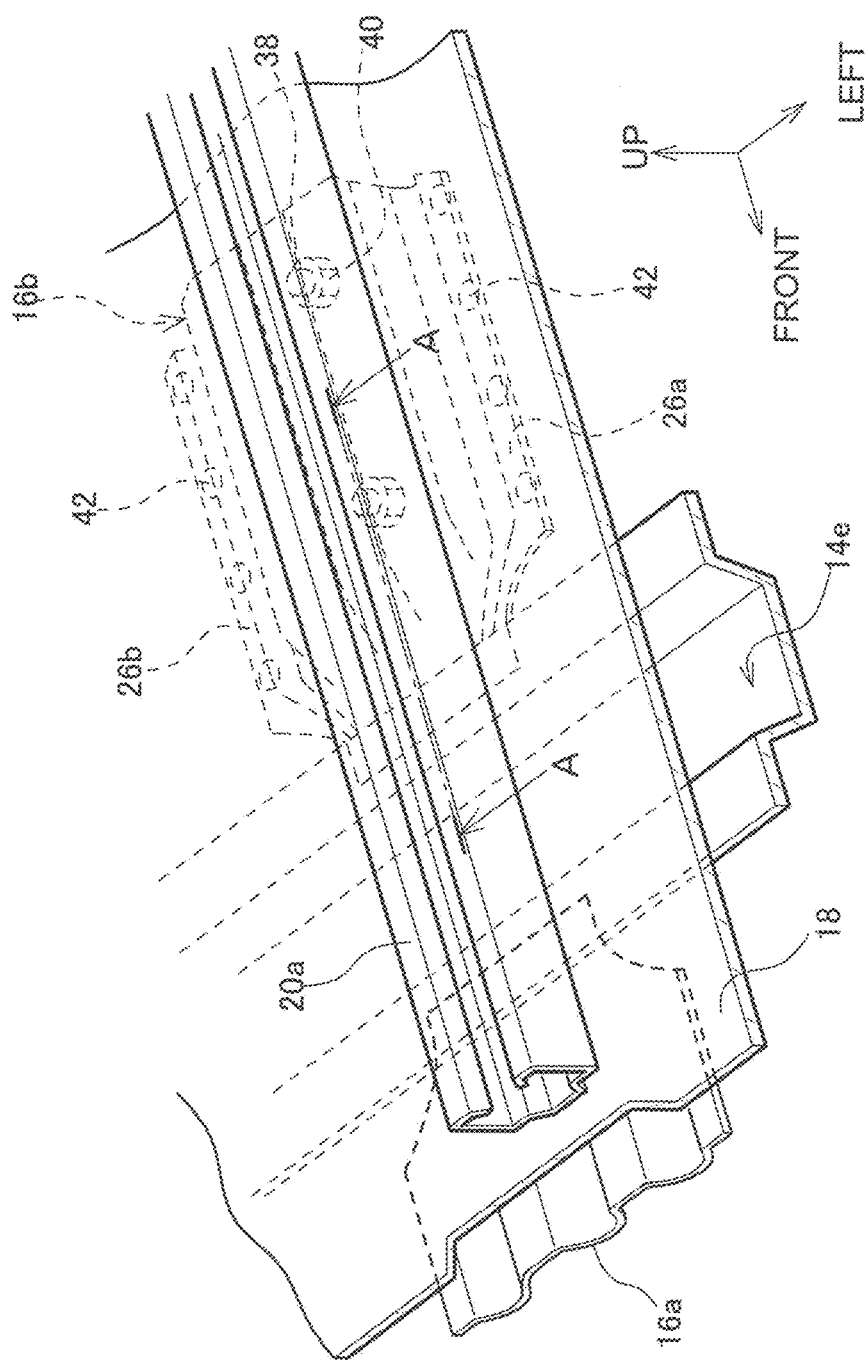
FIG. 3 is a perspective view of a seat rail mounting structure.

FIG. 3 is a perspective view of the seat rail mounting structure, particularly, illustrating a structure relevant to the seat rail 20a. The floor panel 18 and the seat rail 20a both have bolt holes, which are to be stacked on the bolt holes of the retainer 16b. With the bolt holes of the retainer 16b, the floor panel 18, and the seat rail 20a being stacked one on the other, or aligned, a bolt 38 is inserted into the holes from below to be tightened by a nut 40 screwed from above, whereby the retainer 16b, the floor panel 18, and the seat rail 20a are attached together. Additionally, the left flat sections 26a and the right flat section 26b of the retainer 16b are welded on the lower surface of the floor panel 18 at a plurality of welding portions 42 aligned in the front-back direction.

As described above, the seat rail mounting structure according to this embodiment includes the floor panel 18, which constitutes the floor of the cabin, and the seat rail 20a disposed on the upper surface of the floor panel 18. The seat rail mounting structure according to this embodiment further includes the retainer 16b that supports the floor panel 18 at a position where the seat rail 20a is disposed thereabove with the floor panel 18 in-between. A part of the retainer 16b is fixed to the cross member 14e, which serves as a framework member in the bottom of a vehicle, such that the retainer 16b expands from the cross member 14e. The expanding portion of the retainer 16b from the cross member 14e is in contact with the lower surface of the floor panel 18 to thereby support the floor panel 18.

Figure 4:
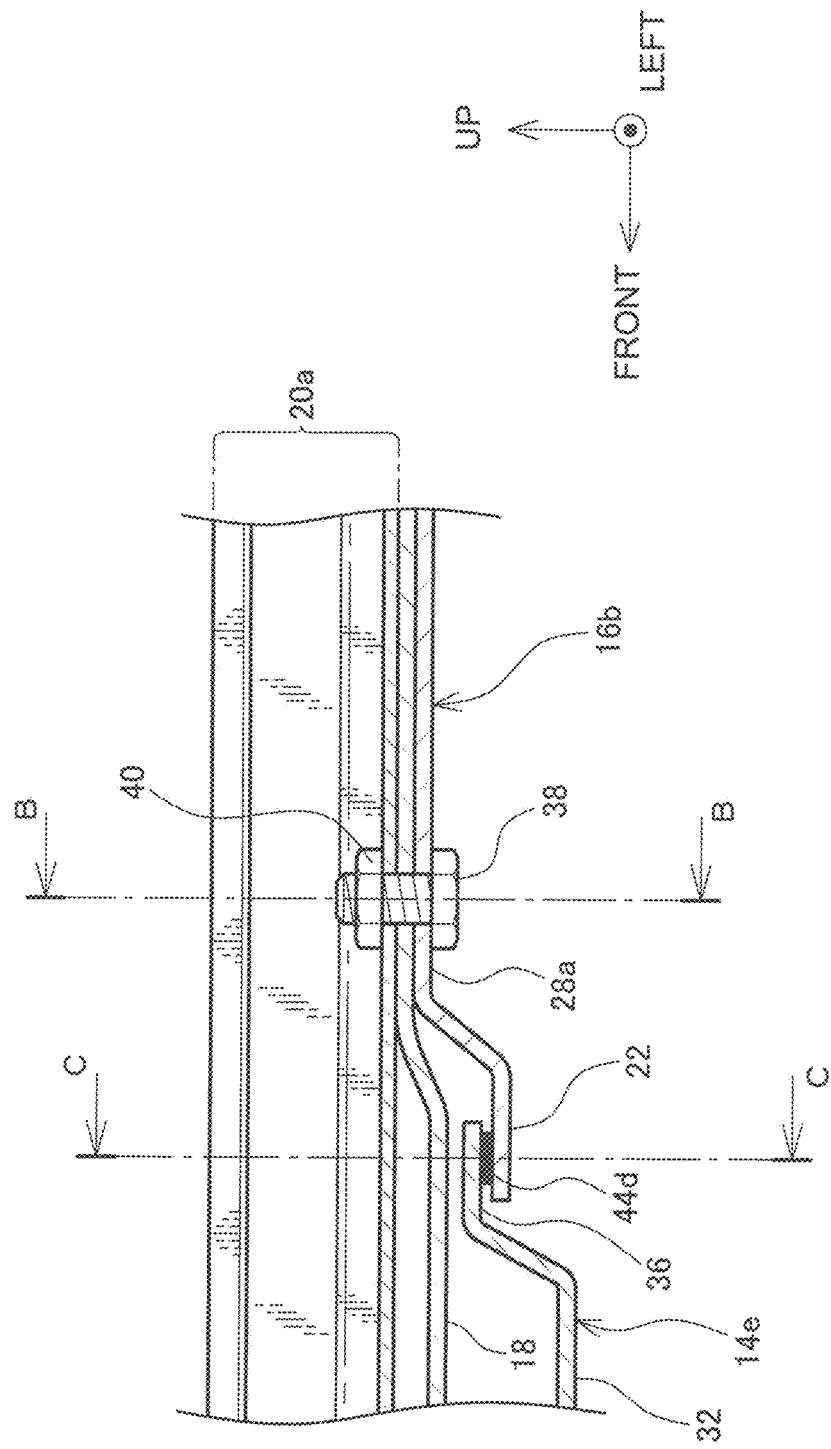
FIG. 4 is a cross sectional view along line A-A in FIG. 3.

FIG. 4 illustrates a cross section along line AA in FIG. 3. A part of the extending section 22 of the retainer 16b is placed overlapping the lower surface of the rear flange 36 of the cross member 14e, and welded on the lower surface of the rear flange 36 at a welding portion 44d. The retainer 16b expands to the rearward of the rear flange 36. Specifically, in the cross section in FIG. 4, the portion constituting the swelling portion 28a extends diagonally rearward and upward from the rear flange 36 and further in the front-back direction. In the area where the retainer 16b expands in the front-back direction, the floor panel 18 and the seat rail 20a are placed one on the other. With the bolt holes of the retainer 16b, the floor panel 18, and the seat rail 20a aligned, the bolt 38 penetrates the aligned holes from below to be tightened by the nut 40 screwed from above, whereby the retainer 16b, the floor panel 18, and the seat rail 20a are attached together.

Figure 5:
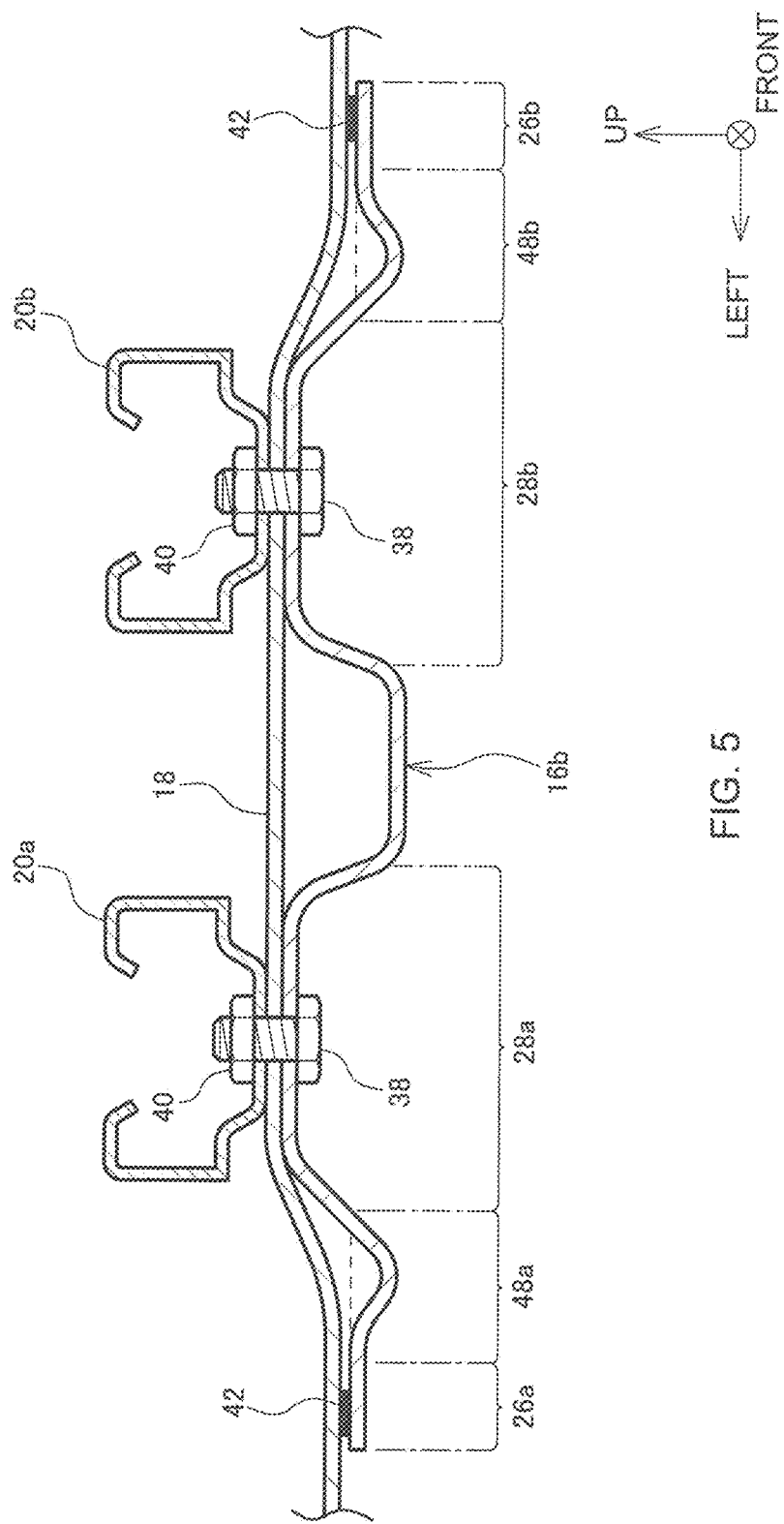
FIG. 5 is a cross sectional view along line B-B in FIG. 4.

FIG. 5 illustrates a cross section along line BB in FIG. 4. The upper surface of the flat section 26a, which expands rightward from the left edge of the retainer 16b, is welded on the lower surface of the floor panel 18 at the welding portion 42. Similarly, the upper surface of the flat section 26b, which expands leftward from the right edge of the retainer 16b, is welded on the lower surface of the floor panel 18 at the welding portion 42. On the upper surface of the swelling portion 28a, the floor panel 18 and the seat rail 20a are disposed overlapping each other, and are attached to each other with the bolt 38 and the nut 40. Similarly, on the upper surface of the swelling portion 28b as well, the floor panel 18 and the seat rail 20b are disposed overlapping each other and are attached to each other with the bolt 38 and the nut 40.

As described above, the retainer 16b and the floor panel 18 are attached to each other with the bolt 38 and the nut 40 at respective positions (bolt fastening positions) where the seat rails 20a, 20b are disposed overlapping the retainer 16b and the floor panel 18, and further welded to each other in the respective flat sections 26a, 26b near the right and left edges. Between the respective welding positions and the bolt fastening positions relative to the floor panel 18 in the respective right and left portions of the retainer 16b, the beads 48a, 48b are formed.

That is, the seat rail mounting structure according to this embodiment includes the bolt 38 and the nut 40 as a first attachment portion for attaching each seat rail (20a, 20b), the floor panel 18, and the retainer 16b at a position where the seat rail (20a, 20b), the floor panel 18, and the retainer 16b are disposed overlapping one another. Additionally, the seat rail mounting structure according to this embodiment includes the welding portion 42 as a second attachment portion for attaching the floor panel 18 and the retainer 16b at a position away from the bolt 38 and the nut 40. The welding portion 42 is a portion in which the flat section 26a, 26b of the retainer 16b is welded on the lower surface of the floor panel 18. The retainer 16b has the bead 48a formed in its left portion between the bolt 38 and nut 40 and the welding portion 42, and also the bead 48b formed in its right portion between the bolt 38 and nut 40 and the welding portion 42. As illustrated in FIG. 3, the respective beads 48a, 48b extend in the longitudinal direction of the seat rails 20a, 20b, or the direction in which the retainer 16b expands from the cross member 14e. Each seat rail extends in the front-back direction (the front-back direction of the vehicle). The welding portion 42 serving as the second attachment portion is positioned away leftward or rightward (in the vehicle width direction) from the bolt 38 and the nut 40, or the first attachment portion. In the example illustrated in FIG. 3, the second attachment portion is positioned further outward in the vehicle width direction relative to the first attaching portion when viewed from the seat rail 20a.

In general, a panel-like member having a bead has an increased strength relative to a force applied in the direction of swelling or reentry of the bead when the bead is fixed to another material such that the bead will not be widened in the side directions. Such a panel-like member is hardly bent in a direction departing from the longitudinal direction of the bead.

Accordingly, the strength of the retainer 16b of the seat rail mounting structure according to this embodiment relative to a force applied in the up-down direction is higher than that of a structure without a bead. Additionally, the strength of the retainer 16b relative to a force curving in a direction departing from the expanding direction (the longitudinal direction of the seat rail) is higher than that of a structure without a bead. This higher mechanical strength of the retainer 16b increases the mechanical strength of the floor panel 18 attached on the upper side of the retainer 16b. Consequently, the floor panel 18 and the retainer 16b are prevented from being deformed by a force applied thereto in the up-down direction from the seat rail 20a or 20b. Note that the mechanical strength of a structure with a seat rail mounted thereon can be increased without increasing the thickness of the retainer 16b and the floor panel 18 or the like.

Figure 6:
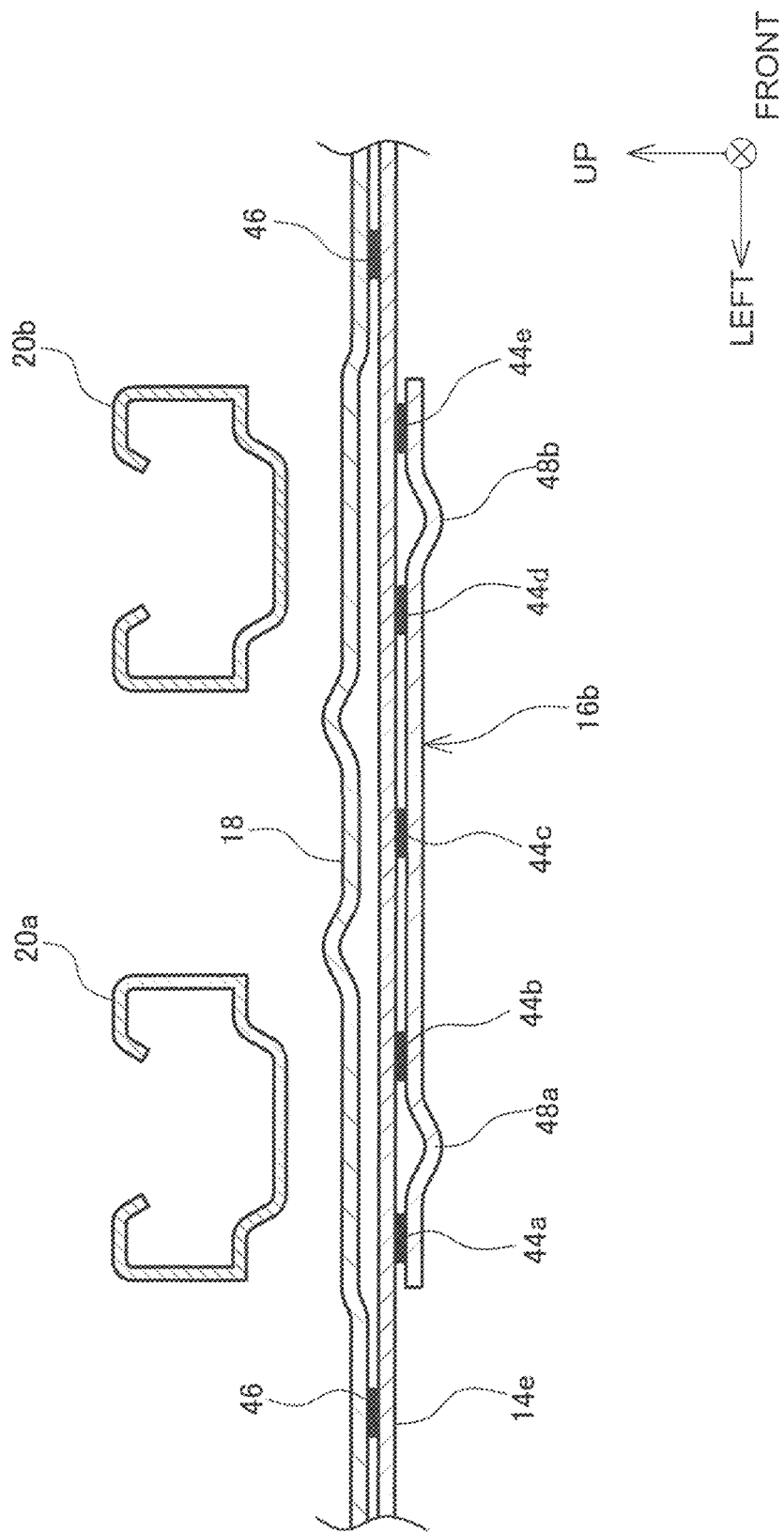
FIG. 6 is a cross sectional view along line C-C in FIG. 4.

FIG. 6 illustrates a cross section along line CC in FIG. 4. The retainer 16b is welded to the cross member 14e at five positions aligned in the right-left direction, resulting in five welding portions 44a to 44e between the retainer 16b and the cross member 14e. Of the five welding portions, the bead 48a is formed between the leftmost welding portion 44a and the welding portion 44b immediately adjacent to (to the right of) the welding portion 44a. Similarly, of the five welding portions, the bead 48b is formed between the rightmost welding portion 44e and the welding portion 44d immediately adjacent to (to the left of) the welding portion 44e. The beads 48a, 48b correspond to the respective extensions of the beads 48a, 48b in FIG. 5, the extensions extending from the main section of the retainer 16b toward the extending section.

In the area where the retainer 16b is placed overlapping the cross member 14e, the floor panel 18, which is disposed above the retainer 16b and the cross member 14e, swells upward. Meanwhile, in respective areas to the right and left of the area with the overlap, or areas without overlap between the retainer 16b and the cross member 14e, the floor panel 18 is positioned closer to the cross member 14e, and welded to the cross member 14e at the respective right and left welding portions 46.

As described above, in the seat rail mounting structure according to this embodiment, the retainer 16b is attached to the cross member 14e at a plurality of welding portions 44a to 44e (retainer attachment portions), which are aligned in a direction intersecting with the expanding direction (the longitudinal direction of the seat rail) of the retainer 16b. Each of the beads (48a, 48b) is formed between two adjacent retainer attachment portions among these retainer attachment portions.

In this structure, the retainer 16b is fixed to the cross member 14e on both sides of each bead. This structure can increase the strength of a part of the retainer 16b, the part overlapping the cross member 14e, as compared with a structure without a bead. The increased strength increases the strength of the retainer 16b relative to a force that causes the retainer 16e to swing around the portion serving as an axis where the retainer 16b is fixed to the cross member 14e.

In the seat rail mounting structure according to this embodiment, as illustrated in FIG. 3, a plurality of sets of the bolt 38 and the nut 40 (a plurality of first attachment portions) are aligned in the expanding direction of the retainer 16b, or the longitudinal direction of the seat rail 20a. Additionally, a plurality of welding portions 42 (a plurality of second attachment portions), where the floor panel 18 is welded on the retainer 16b, are aligned along the longitudinal direction of the seat rail 20a. The left bead 48a extends along the longitudinal direction of the seat rail 20a between the plurality of first attachment portions aligned on the left side and the plurality of second attachment portions aligned on the left side to reach between two adjacent welding portions (between the welding portions 44a and 44b) among the plurality of welding portions 44a to 44e (retainer attachment portions) illustrated in FIG. 6. Meanwhile, the right bead 48b extends along the longitudinal direction of the seat rail 20b between the plurality of first attachment portions aligned on the right side and the plurality of second attachment portions aligned on the right side to reach between two adjacent welding portions (between the welding portions 44d and 44e) among the plurality of welding portions 44a to 44e illustrated in FIG. 6. This structure increases the mechanical strength of the retainer 16b and the floor panel 18 in a wider range extending in the front-back direction where the seat rails 20a, 20b are in contact with the floor panel 18.

Although an example in which two sets of a bolt 38 and a nut 40 are used for every seat rail is illustrated in FIG. 3, three or more sets of a bolt 38 and a nut 40 may be used. Further, although an example in which four welding portions 42 are aligned along the longitudinal direction of the seat rail 20a is illustrated in FIG. 3, any number of welding portions 42 may be aligned.

The seat rail mounting structure according to this embodiment may be used with a seat rail with any seat, such as a front seat, other than a rear seat mounted thereon. For example, in a structure for mounting a seat rail for a front seat, a retainer is attached to the cross members 14c, 14d illustrated in FIG. 1, and a seat rail is disposed on the floor panel covering the upper side of the retainer. A structure for attaching the cross member, the retainer, the floor panel, and the seat rail is the same as that for a rear seat.

The above describes a seat rail mounting structure for a seat that is supported by two seat rails on each side of the seat. Alternatively, a seat may be supported by a single seat rail on each side of the seat. In this case, for example, the structure on the right side relative to the swelling portion 28a of the retainer 16b, illustrated in FIG. 2 and FIG. 3, may be the same as the structure on the left side.

Figure 7:
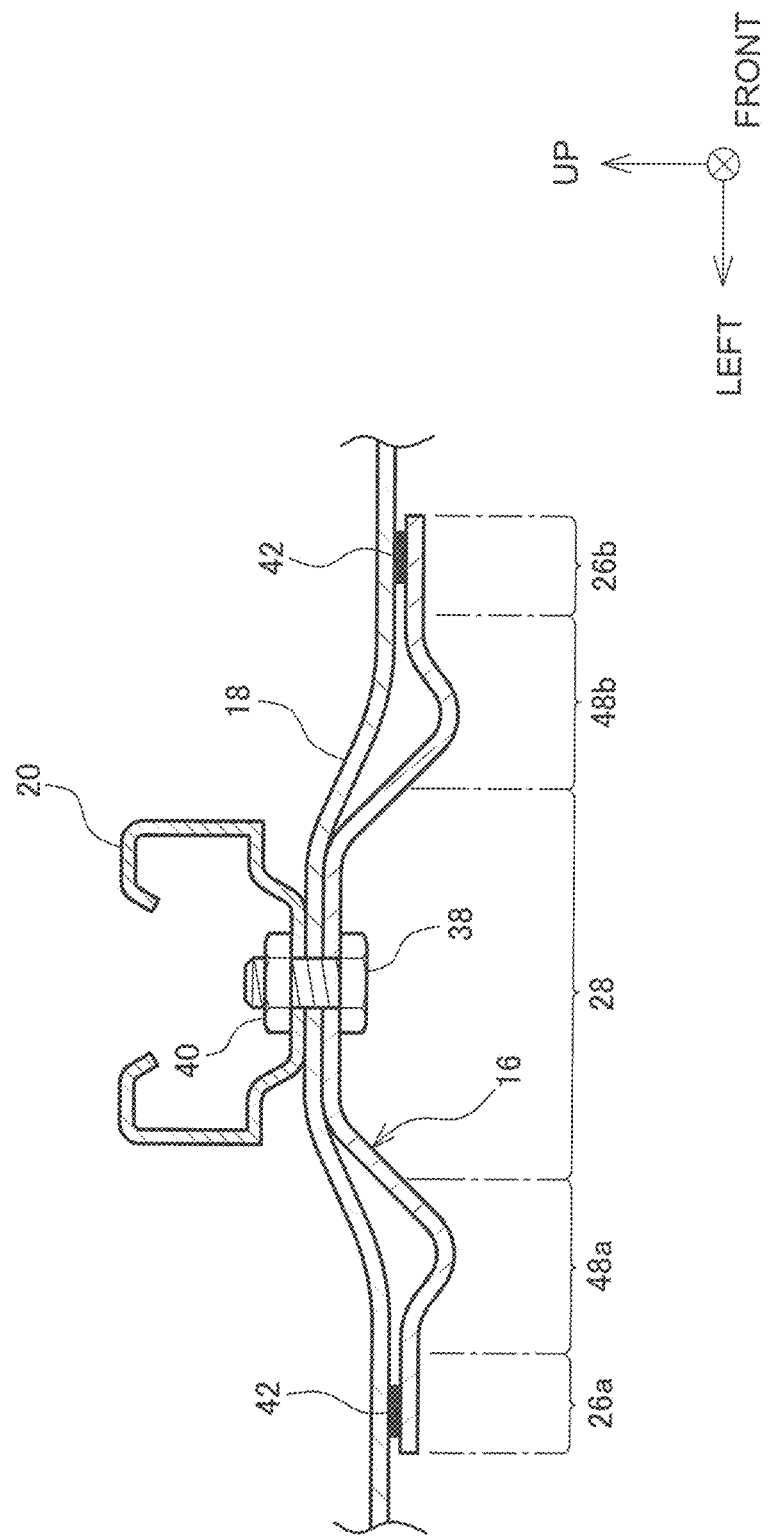
FIG. 7 is a cross sectional view of a seat rail mounting structure with a single seat rail fixed thereto.

FIG. 7 illustrates a cross section of a seat rail mounting structure with a single seat rail 20 fixed thereto, in an area near the swelling portion 28 of the retainer 16. In this structure, the structure on the right side relative to the position where the seat rail 20, the floor panel 18, and the retainer 16 are attached together with the bolt 38 and the nut 40 is the same as the structure on the left side.

Figure 8:
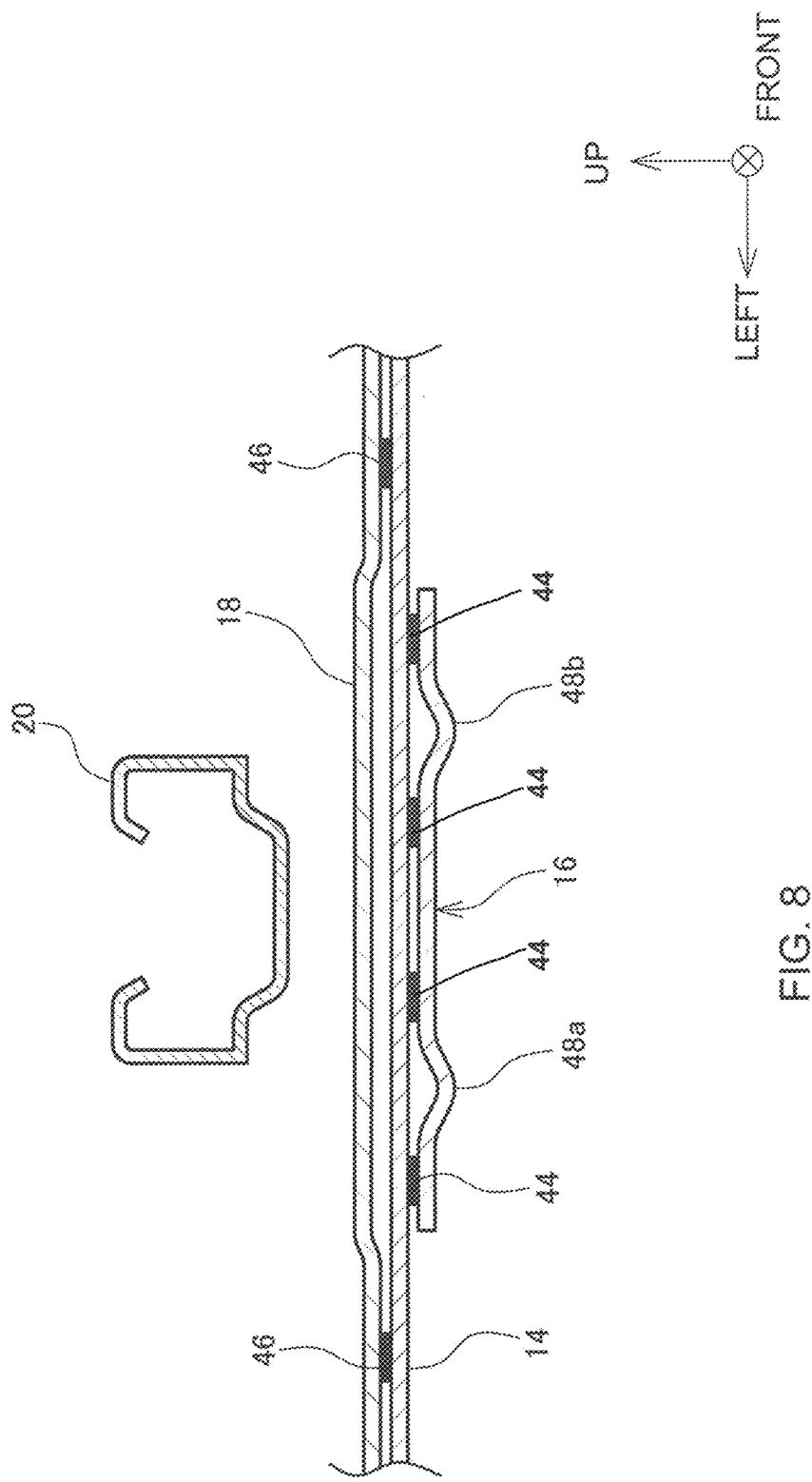
FIG. 8 is a cross sectional view of a seat rail mounting structure with a single seat rail fixed thereto.

FIG. 8 illustrates a cross section of a seat rail mounting structure with a single seat rail 20 fixed thereto, in an area near where the retainer 16 is attached to the cross member 14. Specifically, the retainer 16 is welded to the cross member 14 on each of the right and left sides of the bead 48a on the left side, and on each of the right and left sides of the bead 48b on the right side. Although a symmetrical structure is illustrated in FIG. 7 and FIG. 8, for example, the shapes of the floor panel 18 and the retainer 16, the positions of the welding portions 44, and so forth may be asymmetric, depending on a design condition.

Although an embodiment in which the respective members are welded has been described above, fastening pieces, such as bolts and nuts, and rivets, or the like may be used for attachment of the respective members. Further, although an embodiment in which bolts and nuts are used as fastening pieces for attaching the seat rails, the floor panel, and the retainers has been described above, a bolt alone may be used instead of using a set of a bolt and a nut. In this case, the bolt hole of the retainer may have a screw thread so that a bolt inserted into the bolt holes of the seat rail and the floor panel is fastened in the bolt hole of the retainer. Alternatively, the bolt hole of the seat rail may have a screw thread so that a bolt inserted into the bolt holes of the retainer and the floor panel may be fastened in the bolt hole of the seat rail. Further, although an embodiment in which the respective members are attached together at a plurality of attachment portions (welding portions or sets of a bolt and a nut) aligned in the longitudinal direction of the seat rail has been described above, a structure for attaching the members is not limited to the above, and the respective members may be attached together at an attachment portion, such as a welding portion, that continuously extends in the longitudinal direction of the seat rail.

The invention claimed is:

1. A structure for mounting a seat rail for a vehicle, comprising:
    a floor panel constituting a floor of a cabin;
    a seat rail disposed on an upper surface of the floor panel;
    a retainer for supporting the floor panel at a position where the seat rail is above the retainer with the floor panel located in-between the seat rail and the retainer;
    a first attachment portion for attaching the seat rail, the floor panel, and the retainer at a position where the seat rail, the floor panel, and the retainer are disposed overlapping one another; and
    a second attachment portion for attaching the floor panel and the retainer at a position away from the first attachment portion,
    wherein
    the retainer includes a bead formed between the first attachment portion and the second attachment portion so as to extend along a longitudinal direction of the seat rail.

2. The structure for mounting a seat rail for a vehicle according to claim 1, wherein
    the seat rail extends in a front-back direction of the vehicle, and
    the second attachment portion is defined at a position away leftward or rightward relative to the first attachment portion.

3. The structure for mounting a seat rail for a vehicle according to claim 1, wherein
    a plurality of the first attachment portions and a plurality of the second attachment portions are respectively aligned along the longitudinal direction of the seat rail, and
    the bead extends in the longitudinal direction of the seat rail between the plurality of aligned first attachment portions and the plurality of aligned second attachment portions.

4. The structure for mounting a seat rail for a vehicle according to claim 3, wherein
    the seat rail extends in a front-back direction of the vehicle, and
    the second attachment portion is defined at a position away leftward or rightward relative to the first attachment portion.

5. The structure for mounting a seat rail for a vehicle according to claim 1, further comprising a plurality of retainer attachment portions aligned in a direction intersecting with the longitudinal direction of the seat rail, for attaching the retainer and a framework member in a bottom of the vehicle, wherein
    the bead is formed between two adjacent retainer attachment portions among the plurality of retainer attachment portions.

6. The structure for mounting a seat rail for a vehicle according to claim 5, wherein the bead extends between the first attachment portion and the second attachment portion to reach between two adjacent retainer attachment portions among the plurality of retainer attachment portions.

7. The structure for mounting a seat rail for a vehicle according to claim 5, wherein
    a plurality of the first attachment portions and a plurality of the second attachment portions are respectively aligned along the longitudinal direction of the seat rail, and
    the bead extends between the plurality of first attachment portions aligned and the plurality of second attachment portions aligned to reach between two adjacent retainer attachment portions among the plurality of retainer attachment portions.

8. The structure for mounting a seat rail for a vehicle according to claim 1, wherein
    the retainer includes a section fixed to a framework member in a bottom of the vehicle, and a section expanding from the framework member, for supporting the floor panel, and
    the bead extends in a direction in which the retainer expands from the framework member.

9. The structure for mounting a seat rail for a vehicle according to claim 1, wherein
    the first attachment portion includes a fastening piece that penetrates respective holes defined on the retainer, the floor panel, and the seat rail, and
    the second attachment portion includes a welding portion where the floor panel is welded to the retainer.

10. A structure for mounting a seat rail for a vehicle, comprising:
    a floor panel constituting a floor of a cabin;
    a seat rail disposed on an upper surface of the floor panel;
    a retainer for supporting the floor panel at a position where the seat rail is above the retainer with the floor panel located in-between the seat rail and the retainer;
    a first attachment portion for attaching the seat rail, the floor panel, and the retainer at a position where the seat rail, the floor panel, and the retainer are disposed overlapping one another; and
    a second attachment portion for attaching the floor panel and the retainer at a position away from the first attachment portion,
    wherein
    the retainer includes a bead spaced apart from the floor panel, the bead formed between the first attachment portion and the second attachment portion so as to extend along a longitudinal direction of the seat rail.

11. The structure for mounting a seat rail for a vehicle according to claim 10, wherein
    the seat rail extends in a front-back direction of the vehicle, and
    the second attachment portion is defined at a position away leftward or rightward relative to the first attachment portion.

12. The structure for mounting a seat rail for a vehicle according to claim 10, wherein a plurality of the first attachment portions and a plurality of the second attachment portions are respectively aligned along the longitudinal direction of the seat rail, and the bead extends in the longitudinal direction of the seat rail between the plurality of aligned first attachment portions and the plurality of aligned second attachment portions.

13. The structure for mounting a seat rail for a vehicle according to claim 12, wherein the seat rail extends in a front-back direction of the vehicle, and the second attachment portion is defined at a position away leftward or rightward relative to the first attachment portion.

14. The structure for mounting a seat rail for a vehicle according to claim 10, further comprising a plurality of retainer attachment portions aligned in a direction intersecting with the longitudinal direction of the seat rail, for attaching the retainer and a framework member in a bottom of the vehicle, wherein the bead is formed between two adjacent retainer attachment portions among the plurality of retainer attachment portions.

15. The structure for mounting a seat rail for a vehicle according to claim 14, wherein the bead extends between the first attachment portion and the second attachment portion to reach between two adjacent retainer attachment portions among the plurality of retainer attachment portions.

16. The structure for mounting a seat rail for a vehicle according to claim 14, wherein a plurality of the first attachment portions and a plurality of the second attachment portions are respectively aligned along the longitudinal direction of the seat rail, and the bead extends between the plurality of first attachment portions aligned and the plurality of second attachment portions aligned to reach between two adjacent retainer attachment portions among the plurality of retainer attachment portions.

17. The structure for mounting a seat rail for a vehicle according to claim 10, wherein the retainer includes a section fixed to a framework member in a bottom of the vehicle, and a section expanding from the framework member, for supporting the floor panel, and the bead extends in a direction in which the retainer expands from the framework member.

18. The structure for mounting a seat rail for a vehicle according to claim 10, wherein the first attachment portion includes a fastening piece that penetrates respective holes defined on the retainer, the floor panel, and the seat rail, and the second attachment portion includes a welding portion where the floor panel is welded to the retainer.

* * * * *